United States Patent
Chang

(10) Patent No.: US 8,358,489 B2
(45) Date of Patent: Jan. 22, 2013

(54) SMART PHOTOVOLTAIC PANEL AND METHOD FOR REGULATING POWER USING SAME

(75) Inventor: Charles Chang, Coto De Caza, CA (US)

(73) Assignee: International Rectifier Corporation, El Segundo, CA (US)

(*) Notice: Subject to any disclaimer, the term of this patent is extended or adjusted under 35 U.S.C. 154(b) by 326 days.

(21) Appl. No.: 12/807,082

(22) Filed: Aug. 27, 2010

(65) Prior Publication Data

US 2012/0049833 A1    Mar. 1, 2012

(51) Int. Cl.
*H02J 7/00* (2006.01)
(52) U.S. Cl. .......................... 361/18; 307/150
(58) Field of Classification Search .......... 361/18; 136/244, 248; 307/150
See application file for complete search history.

(56) References Cited

U.S. PATENT DOCUMENTS

| | | | |
|---|---|---|---|
| 6,350,944 B1 | 2/2002 | Sherif | |
| 6,369,462 B1 | 4/2002 | Siri | |
| 7,394,237 B2 | 7/2008 | Chou | |
| 8,058,752 B2* | 11/2011 | Erickson et al. | 307/150 |
| 2004/0257842 A1 | 12/2004 | Hui | |
| 2005/0110454 A1 | 5/2005 | Tsai | |
| 2006/0162772 A1 | 7/2006 | Presher | |
| 2006/0237058 A1 | 10/2006 | McClintock | |
| 2008/0164766 A1* | 7/2008 | Adest et al. | 307/80 |
| 2008/0238195 A1 | 10/2008 | Shaver | |
| 2008/0303503 A1 | 12/2008 | Wolfs | |
| 2008/0306700 A1 | 12/2008 | Kawam | |
| 2009/0078300 A1 | 3/2009 | Ang | |
| 2009/0147554 A1 | 6/2009 | Adest | |
| 2009/0179662 A1 | 7/2009 | Moulton | |
| 2009/0206666 A1 | 8/2009 | Sella | |
| 2009/0218887 A1 | 9/2009 | Ledenev | |
| 2011/0139213 A1* | 6/2011 | Lee | 136/244 |

FOREIGN PATENT DOCUMENTS

| | | |
|---|---|---|
| CN | 201194333 Y | 2/2009 |
| JP | 2007129852 | 5/2007 |
| JP | 2008-270698 | 11/2008 |
| WO | WO 2004/107543 A2 | 12/2004 |
| WO | WO2008/124144 A1 | 10/2008 |
| WO | WO 2008/125915 A2 | 10/2008 |
| WO | WO 2009/082708 A1 | 7/2009 |

* cited by examiner

*Primary Examiner* — Danny Nguyen
(74) *Attorney, Agent, or Firm* — Farjami & Farjami LLP

(57) ABSTRACT

According to one embodiment, a smart photovoltaic (PV) panel comprises a plurality of PV cell groups each including at least one PV cell. The smart PV panel also includes at least one serial boost combiner circuit (SBCC) configured to receive an output from the plurality of PV cell groups as inputs. Each SBCC comprises several boost blocks connected in parallel, each of the boost blocks including a switching device and a respective boost block output directly connected to an output node of the SBCC. In addition a corresponding power terminal of each of the switching devices is directly connected to a common ground node of the SBCC. In one embodiment, the smart PV panel also includes a power inverter coupled to the one or more SBCCs and a communication unit interfaced with a local controller.

20 Claims, 4 Drawing Sheets

SMART PHOTOVOLTAIC PANEL AND METHOD FOR REGULATING POWER USING SAME

BACKGROUND OF THE INVENTION

1. Field of the Invention

The present invention is generally in the field of electrical circuits and systems. More specifically, the present invention is in the field of power regulation circuits and systems.

2. Background Art

There are numerous compelling factors motivating a transition away from the use of fossil fuel reserves as a primary source of commercial energy. Factors such as potential exhaustion of the fossil fuel reserves themselves, the fact that those reserves are non-renewable on human timescales, and the adverse impacts on the environment associated with their extraction, refinement, and conversion to usable energy forms, for example, have cast renewable energy sources in an attractive light.

Despite the serious disadvantages accruing from their use, however, fossil fuels have been a reliable and abundant source of the energy that is critical to sustained economic growth. In order for renewable "green" energy sources such as solar power, wind energy, and geothermal energy, for instance, to successfully supplant, or even to substantially reduce the use of fossil fuel energy sources, those green energy sources must become more efficient and must more reliably provide energy on an "on demand" basis than has historically been the case.

Solar power, for example, is a potentially attractive energy source due to the predictable behavior of its source. Conventional approaches to harnessing solar energy have typically implemented arrays of photovoltaic (PV) panels, connected in series, in combination with an electrical inverter configured to convert the collected solar energy to commercially useful alternating current (AC) for transmission by a conventional power line. Unfortunately, that approach tends to limit the performance of the array as a whole, such as its maximum power point performance, for example, to the performance of the least efficient and weakest of its constituent PV panels.

A more recent conventional solution, sometimes aspirationally characterized as "power optimization," provides each PV panel with its own inverter and maximum power point tracking (MPPT) circuitry. That approach is theoretically capable of improving the collective performance of an array of PV panels through an in principle optimization of the performance of each panel. However, this approach is likely to be less than successful in optimizing power output as speculated, because it treats each PV panel as a monolithic and isolated element within a solar energy collection system.

Thus, there is a need to overcome the drawbacks and deficiencies in the art by providing a smart PV panel configured to adjust its performance in response to environmental and state conditions so as to enable enhanced energy harvesting from a PV panel array, such as a solar energy collection array.

SUMMARY OF THE INVENTION

A smart photovoltaic panel and method for regulating power using same, substantially as shown in and/or described in connection with at least one of the figures, as set forth more completely in the claims.

DETAILED DESCRIPTION OF THE INVENTION

Figure 1:
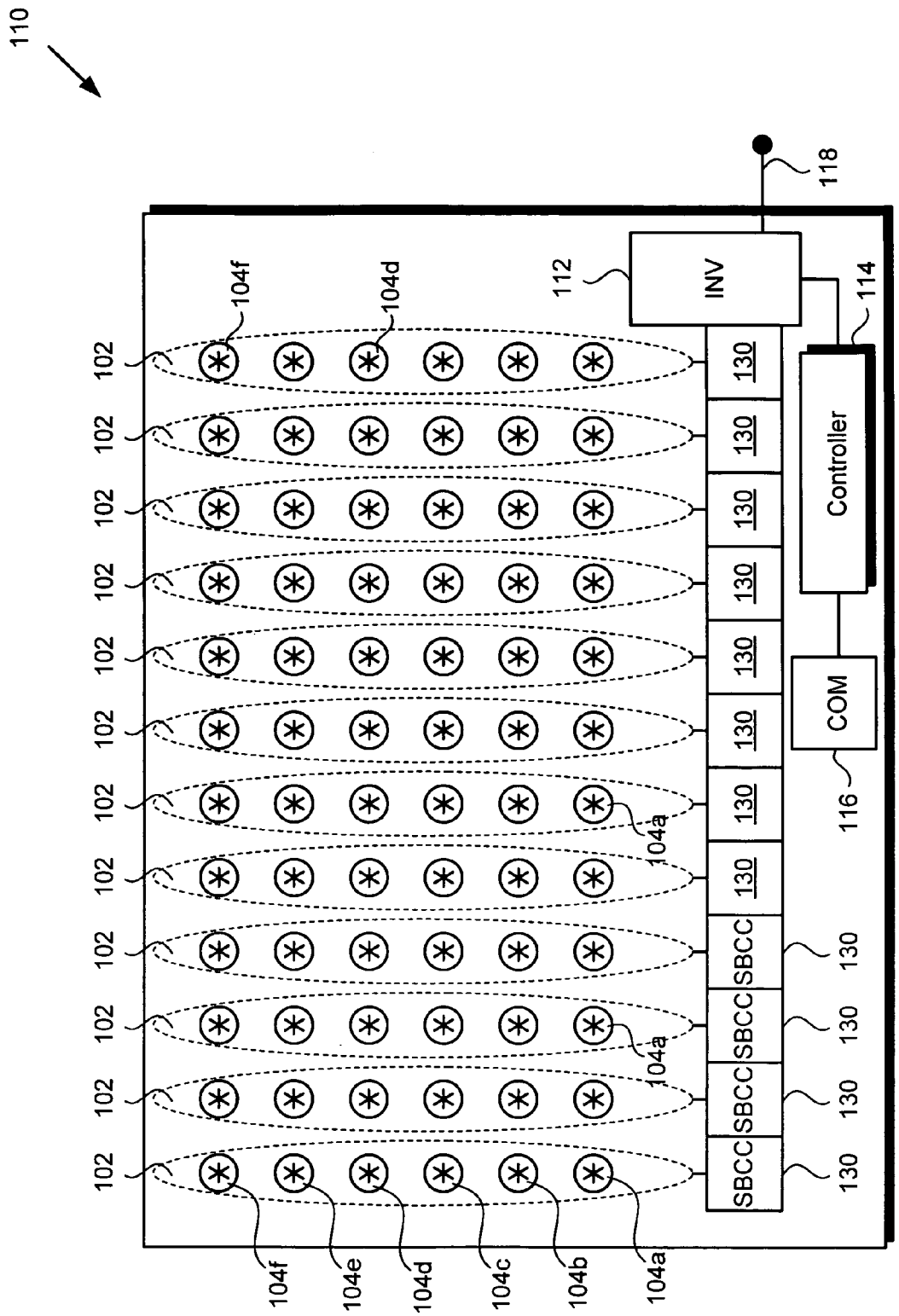
FIG. 1 is a conceptual diagram showing selected features of a smart photovoltaic (PV) panel, according to one embodiment of the present invention.

The present invention is directed to a smart photovoltaic (PV) panel and method for regulating power using same. Although the invention is described with respect to specific embodiments, the principles of the invention, as defined by the claims appended herein, can obviously be applied beyond the specifically described embodiments of the invention described herein. Moreover, in the description of the present invention, certain details have been left out in order to not obscure the inventive aspects of the invention. The details left out are within the knowledge of a person of ordinary skill in the art.

The drawings in the present application and their accompanying detailed description are directed to merely example embodiments of the invention. To maintain brevity, other embodiments of the invention, which use the principles of the present invention, are not specifically described in the present application and are not specifically illustrated by the present drawings. It should be borne in mind that, unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 is a conceptual diagram showing selected features of smart PV panel 110, according to one embodiment of the present invention. As shown in FIG. 1, smart PV panel 110 comprises numerous PV cells arranged as PV cell groups 102, each PV cell group including respective PV cells 104a, 104b, 104c, 104d, 104e, and 104f (hereinafter "PV cells 104a-104f"), and being connected to respective serial boost combiner circuit (SBCC) 130. In addition, and as further shown in FIG. 1, smart PV panel 110 includes power inverter 112 coupled to SBCCs 130, local controller 114, communication unit 116 interfaced with local controller 114, and panel output 118.

By way of perspective, in one embodiment, smart PV panel 110 may be implemented as a solar panel, as part of a solar energy collection array. Local controller 114, can be configured to provide dynamic power regulation of PV cell groups 102, including maximum power point tracking for PV cell group 102, for example, and may utilize each SBCC 130 to optimize power conversion from its respective PV cell group 102. Moreover, smart PV panel 110 can utilize communication unit 114 to exchange state information with other similarly equipped smart PV panels linked by a communication network (not shown in FIG. 1). As a result, smart PV panel 110 can not only be configured to optimize its own performance, e.g., its harvesting of solar energy using PV cell groups 102, but to regulate the power provided through PV output 118 according to the performance of other networked smart PV panels so as to optimize the performance of the solar energy collection array as a whole. In one embodiment, for example, power regulation for the solar energy collection array as a whole may be distributed among local controllers, such as local controller 114, present on the smart PV panels, such as smart PV panel 110, comprised by the solar array.

It is noted that although the embodiment of FIG. 1, as well as other embodiments included in the present disclosure, represent a smart PV panel as comprising seventy-two (72) PV cells arranged as twelve (12) PV cell groups of six (6) PV cells each, such as PV cell groups 102 including PV cells 104a-104f, that characterization should not be interpreted as limiting. For example, in other embodiments, smart PV panel 110 may include more, or fewer, total PV cells, PV cell groups, and PV cells per PV cell group, than is explicitly represented by the figures provided herein. In one embodiment, for instance, each PV cell group 102 may include as few as one PV cell per group. In that embodiment, each PV cell of the smart PV panel could be individually managed to provide maximum power point tracking (MPPT) on a per PV cell basis, for example, if desired.

Figure 2:
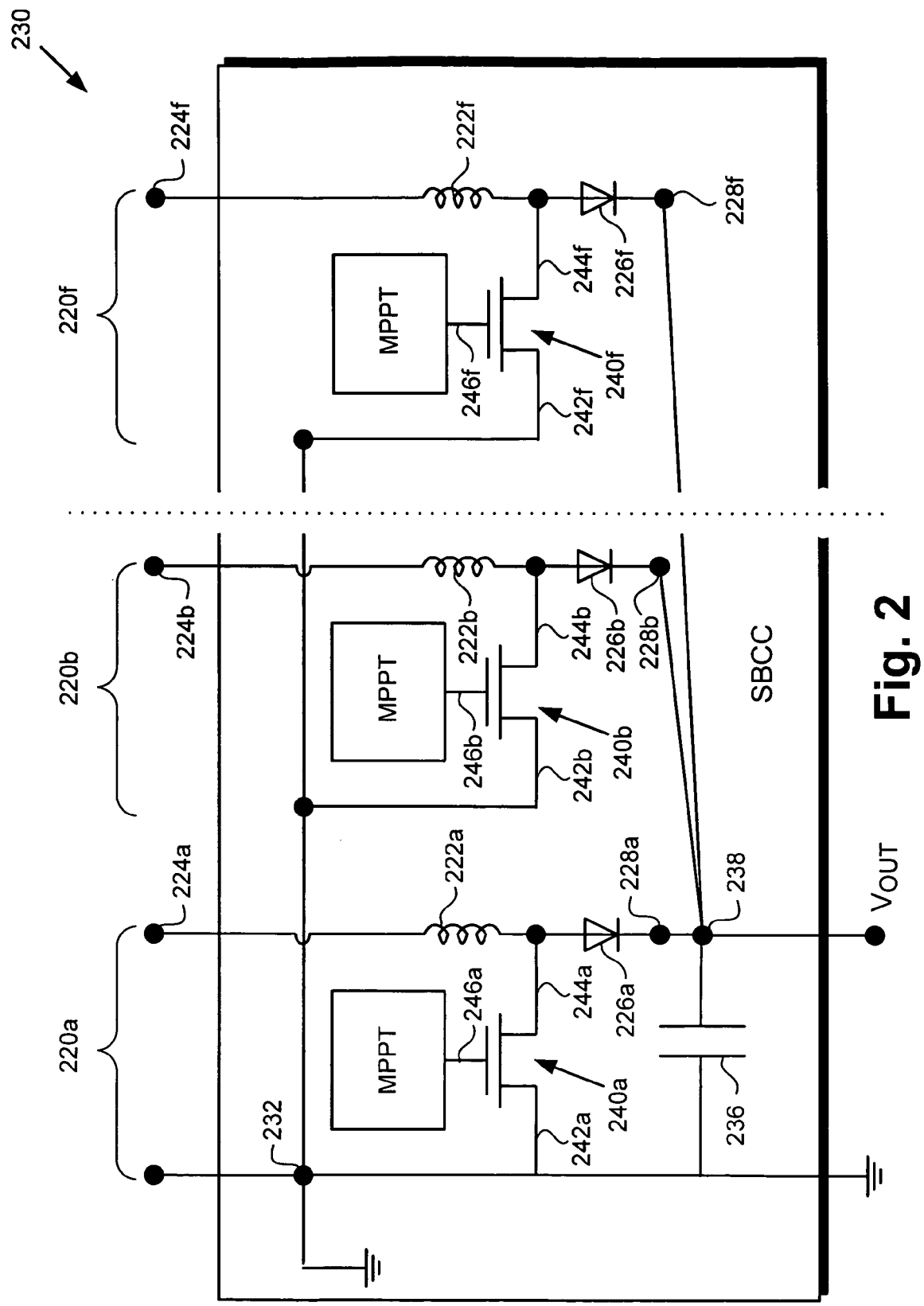
FIG. 2 is a conceptual diagram showing a more detailed representation of a serial boost combiner circuit suitable for use in a smart PV panel, according to one embodiment of the present invention.

Turning to FIG. 2, FIG. 2 is a conceptual diagram showing a more detailed representation of a serial boost combiner circuit suitable for use in a smart PV panel, according to one embodiment of the present invention. SBCC 230 corresponds to any of SBCCs 130, shown in FIG. 1. As may be apparent from FIG. 2, SBCC 230 is only partially shown by that figure. For example, although SBCC 230 is explicitly shown to comprise boost blocks 220a, 220b, and 220f for converting PV cell power received from respective PV cells 104a, 104b, and 104f of PV cell group 120, in FIG. 1, SBCC 230 further includes boost blocks for receiving PV cell power from respective PV cells 104c, 104d, and 104e, as indicated by the broken vertical line and unshaded lateral spacing between boost blocks 220b and 220f. It is noted that boost blocks 220a, 220b, and 220f will hereinafter be referred to collectively as boost blocks 220a-220f to signify inclusion of unseen boost blocks 220c, 220d, and 220e arranged between boost blocks 220b and 220f.

As shown in FIG. 2, SBCC 230 includes ground node 232, input nodes 224a, 224b, and 224f of respective boost blocks 220a, 220b, and 220f, and output node 238. As further shown in FIG. 2, SBCC 230 also comprises storage capacitor 236 coupled between output node 238 of SBCC 230 and ground node 232, which may serve as a common ground node for all of boost blocks 220a-220f. According to the embodiment of FIG. 2, boost blocks 220a-220f are connected in parallel.

Boost block 220a includes switching device 240a, inductor 222a, diode 226a, and boost block output node 228a, which, as shown in FIG. 2, is directly connected to output node 238 of SBCC 230. Switching device 240a, which may be implemented as a field-effect transistor (FET), for example, includes power terminals 242a and 244a, and control terminal 246a. As shown in FIG. 2, control terminal 246a of switching device 240a can be configured to receive control signals, such as MPPT control signals, from control circuitry of the smart PV panel comprising SBCC 230, such as power inverter 112 and local controller 114, in FIG. 1.

Similarly, boost blocks 220b and 220f include respective switching devices 240b and 240f, respective inductors 222b and 222f, respective diodes 226b and 226f, and respective boost block output nodes 228b and 228f directly connected to output node 238 of SBCC 230. As shown in FIG. 2, in one embodiment, input nodes 224a, 224b, and 224f of respective boost blocks 220a, 220b, and 220f are coupled to respective boost block output nodes 228a, 228b, and 228f by the respective series connected inductor/diode combinations 222a/226a, 222b/226b, and 222f/226f. In addition, according to the embodiment of FIG. 2, corresponding power terminals 242a, 242b, and 242f of respective switching devices 240a, 240b, and 240f are all directly connected to common ground node 232 of SBCC 230.

In one embodiment, another corresponding power terminal of switching devices 240a, 240b, and 240f, e.g., respective power terminals 244a, 244b, and 244f, are each coupled to respective boost block output nodes 228a, 228b, and 228f by respective diodes 226a, 226b, and 226f, such as by being connected to respective nodes situated between respective series connected inductor/diode combinations 222a/226a, 222b/226b, and 222f/226f, as is also shown by FIG. 2. Moreover, as previously described with regard to switching device 240a, control terminals 246b and 246f of respective switching devices 240b and 240f can be configured to receive control signals, such as MPPT control signals.

It is noted that the embodiment shown in FIG. 2 is represented so as to correspond to the arrangement of PV cell and PV cell groups shown in FIG. 1. As a result, SBCC 230, in FIG. 2 is shown to comprise six (6) boost blocks. However, in other embodiments, SBCC 230 might comprise more, or fewer than six boost blocks. Moreover, in some embodiments, a smart PV panel, such as smart PV panel 110 in FIG. 1, may implement a sequential serial boost regime. For example, in addition to SBCCs 130 used to combine PV cell power received from PV cell groups 102, a second level of serial boosting might be performed by an additional SBCC having, for example, twelve boost blocks to accommodate the twelve channels represented by the outputs of each of SBCCs 130 (additional twelve channel SBCC not shown in FIG. 1).

Figure 3:
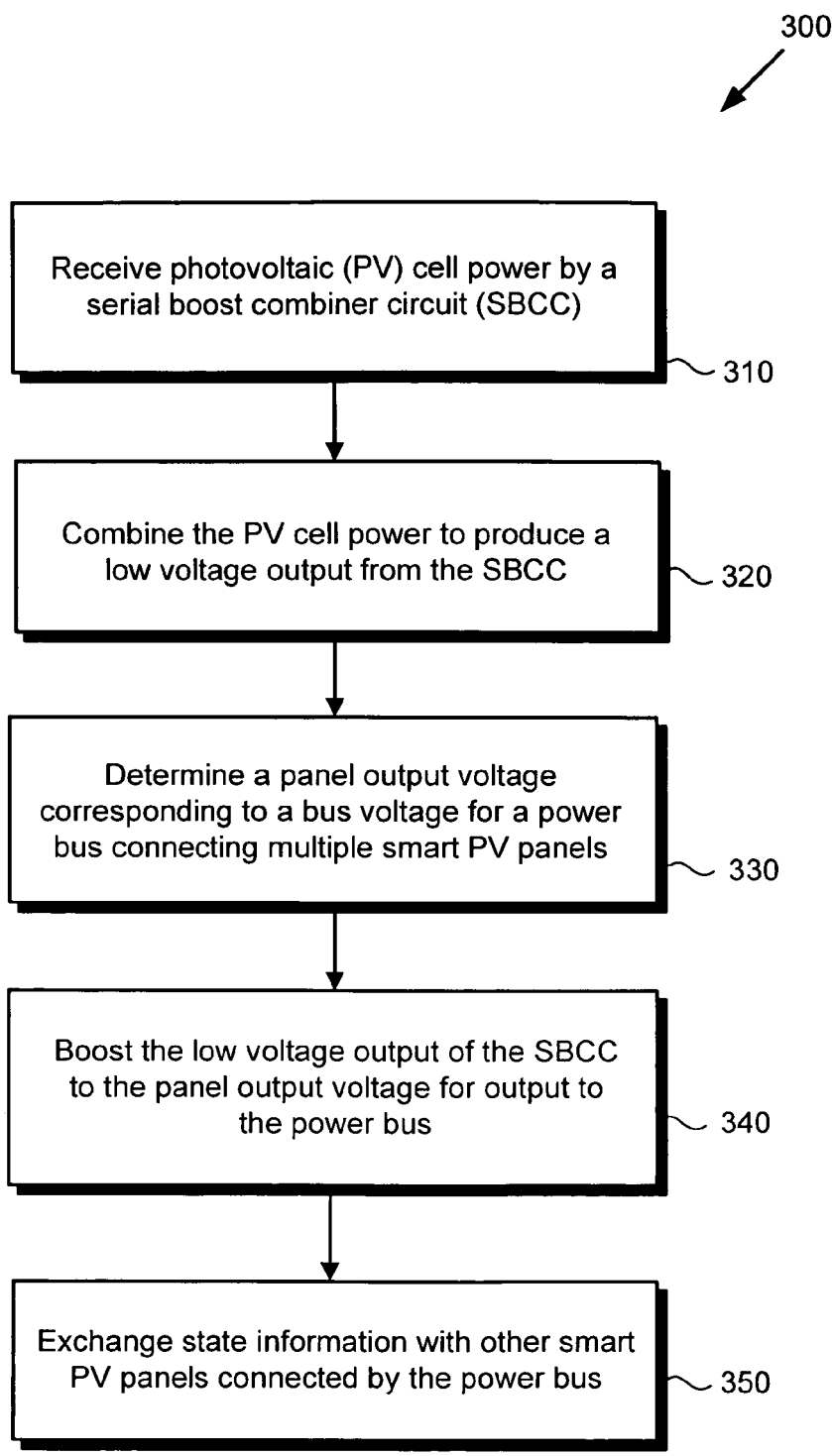
FIG. 3 shows a flowchart presenting a method for regulating power by a smart PV panel, according to one embodiment of the present invention.
Figure 4:
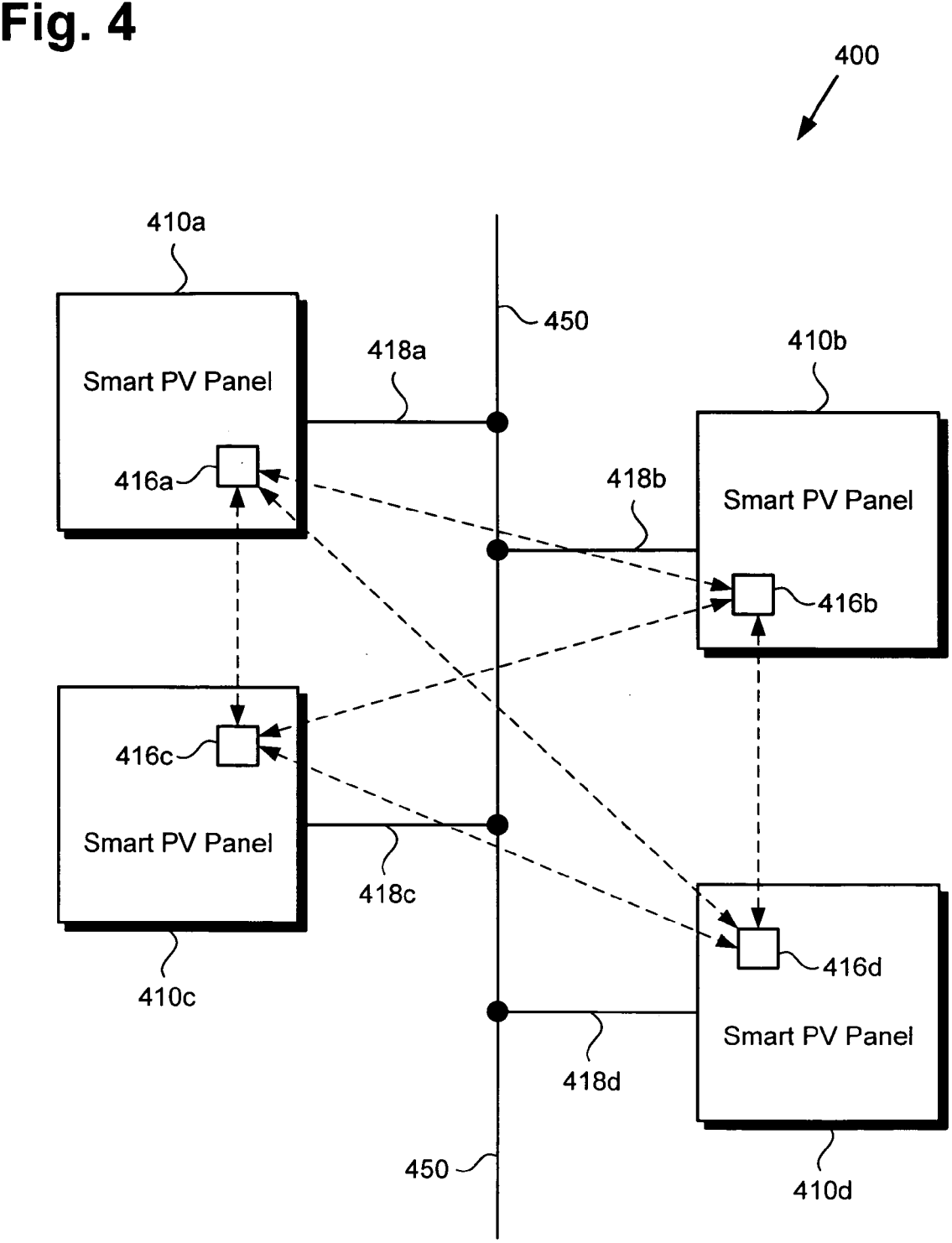
FIG. 4 is a block diagram showing a networked array of smart PV panels, according to one embodiment of the present invention.

The operation of smart PV panel 110, in FIG. 1, and SBCC 230, in FIG. 2, will now be further described in combination with FIGS. 3, and 4. FIG. 3 shows a flowchart presenting a method for regulating power by a smart PV panel, according to one embodiment of the present invention, while FIG. 4 is a block diagram showing a networked array of smart PV panels, according to one embodiment of the present invention.

Referring to FIG. 4, networked array 400 comprises smart PV panel 410a including communication unit 416a, smart PV panel 410b including communication unit 416b, smart PV panel 410c including communication unit 416c, and smart PV panel 410d including communication unit 416d, (hereinafter "smart PV panels 410a-410d"). Each of smart PV panels 410a-410d can correspond to smart PV panel 110, in FIG. 1, for example. As shown in FIG. 4, smart PV panels 410a-410d are connected to power bus 450 by respective panel outputs 418a, 418b, 418c, and 418d (hereinafter "panel outputs 418a-418d"), which may be seen to correspond to panel output 118, in FIG. 1. According to the embodiment shown in FIG. 4, each of smart PV panels 410a-410d is in communication with every other of smart PV panels 410a-410d through communication links mediated by respective communication units 416a, 416b, 416c, and 416d, which may be wired or wireless communication links, for example, corresponding to communication unit 116 in FIG. 1.

Turning to FIG. 3, FIG. 3 presents flowchart 300 describing one embodiment of a method for regulating power by a smart PV panel. Certain details and features have been left out of flowchart 300 that are apparent to a person of ordinary skill in the art. For example, a step may comprise one or more substeps or may involve specialized equipment or materials, as known in the art. While steps 310 through 350 indicated in flowchart 300 are sufficient to describe one embodiment of the present invention, other embodiments of the invention may utilize steps different from those shown in flowchart 300, or may comprise more, or fewer, steps.

Referring to step 310 in FIG. 3, step 310 of flowchart 300 comprises receiving PV cell power by an SBCC. Referring first to smart PV panel 110, in FIG. 1, step 310 of flowchart 300 may be performed by smart PV panel 110 through use of each of SBCCs 130, operating under the control of local controller 114. Thus, according to the embodiment of FIG. 1, step 310 corresponds to SBCCs 130 receiving PV cell power from respective PV cell groups 102, each of which is shown to include PV cells 104a-104f. Referring now to FIG. 2, step 310 may be further seen to correspond to receipt of PV cell power from PV cells 104a, 104b, and 104f at respective input nodes 224a, 224b, and 224f of boost blocks 220a, 220b, and 220f.

Moving to step 320 in FIG. 3 and continuing to refer to FIGS. 1 and 2, step 320 of flowchart 300 comprises combining the PV cell power to produce a low voltage output from SBCC 130/230. As previously mentioned, PV cell power may be received from each of PV cells 104a-104f at the respective input nodes of boost blocks 220a-220f. Operating in a discontinuous mode, for example, SBCC 230 can be configured to accumulate the PV cell power received through each of boost blocks 220a-220b as a voltage across storage capacitor 236. For instance, a typical PV cell, such as PV cells 104a-104f may generate approximately 0.5 V. SBCC 230 is configured to combine the voltage output of as many as six individual PV cells to provide up to approximately 3.0 V as a low voltage output at output node 238.

Continuing with step 330 of FIG. 3, step 330 of flowchart 300 comprises determining a panel output voltage corresponding to a bus voltage for a power bus connecting multiple smart PV panels. Referring to FIG. 4, power bus 450 may have a bus voltage of approximately 600 V, for example. A desirable output voltage from smart PV panel 410a, for example, can depend on the total number of smart PV panels connected to power bus 450, and the voltage being provided as outputs from those other smart PV panels. Although networked array 400 shows only four smart PV panels connected to power bus 450, that representation is provided for conceptual clarity only. In practice, power bus 450 may connect dozens of smart PV panels, for example.

Referring to FIG. 1, step 330 can be performed by smart PV panel 110, using local controller 114 and communication unit 116, for example. In one embodiment, for instance, communication unit 116 can be configured to receive information from the smart PV panel array including smart PV panel 110, such as the maximum bus voltage of power bus 450 and the number of smart PV panels connected to power bus 450. Local controller 114 can then utilize that information to determine a suitable voltage for output to the power bus through smart PV panel output 118.

Moving now to step 340 of FIG. 3 and continuing to refer to smart PV panel 110, in FIG. 1, step 340 of flowchart 300 comprises boosting the low voltage output of SBCCs 130 to the panel output voltage determined in previous step 330. Step 340 can be performed by smart PV panel 110 using power inverter 112 and local controller 114, for example.

Unlike conventional approaches to providing localized power inversion, the present method advantageously enables omission of voltage reduction circuitry, such as a buck circuit, for reducing output voltage. For example, according to a conventional arrangement for a PV panel, all of the seventy-two (72) PV cells shown in FIG. 1 would typically be connected in series. As a result, those series connected PV cells could provide as much as approximately 36 V of combined output, which may exceed the acceptable voltage threshold for output to a connected power bus. Under those or similar circumstances, a PV panel would be required to include buck circuitry to appropriately adjust the output voltage from the panel downward to accommodate the voltage constraints on the power bus.

Because embodiments of the present invention utilize SBCCs 130 to regulate power harvested from groups of PV cells included on smart PV panel 110, the arrangement of PV cell groups 102 can be determined to provide an inherently low voltage output from each SBCC 130. Consequently, the grouping of PV cells on smart PV panel 110 can be arranged so as to assure that only boost circuitry will be required to harmonize the outputs of low voltage output SBCCs 130 and the voltage required for panel output 118.

Continuing with step 350 of FIG. 3, step 350 of flowchart 300 comprises exchanging state information with other smart PV panels connected by the power bus. Referring once again to FIG. 4, step 350 can be seen to correspond to ongoing exchange of state information among smart PV panels 410a-410d. Each of smart PV panels 410a-410d can be configured to adjust its own performance dynamically, in response to changes in performance of other networked smart PV panels.

For example, partial shading of smart PV panel 410a early in the day can result in a reduction in power harvested from smart PV panel 410a and delivered to power bus 450. State information received by each of smart PV panels 410b, 410c, and 410d from smart PV panel 410a and from one another can result in some or all of those smart PV panels increasing its own output to compensate for the partial shading of smart PV panel 410a. Similarly, partial shading of smart PV panel 410d later in the day may trigger an analogous compensatory response from some or all of smart PV panels 410a, 410b, and 410c. Consequently, power regulation for networked array 400 can effectively be distributed among the networked local controllers included on each of smart PV panels 410a-410d, as well as other networked smart PV panels connected to power bus 450 but not shown in FIG. 4.

Thus various embodiments of the present invention enable significant advantages over the conventional art. For example, by grouping subsets of the PV cells included in a smart PV panel and regulating the power harvested from each group separately, embodiments of the present invention enable optimizing the energy harvest from a smart PV panel even in the event of malfunction, damage, or obscuring of some of the PV cells of PV cell groups. In addition, by selectively combining the energy accumulated by the PV cells on a group by group basis using respective serial boost combining circuits, embodiments of the present invention provide an inherently low voltage output from the collected PV cells, which further enables omission of voltage reduction circuitry in regulating the output of the smart PV panel as a whole. Moreover, by networking an array of locally controlled smart PV panels over a communication network and configuring the smart PV panels to exchange state information over that network, embodiments of the present invention enable a distributed power regulation scheme in which the constituent smart PV panels can dynamically respond to changes in power output across the array.

From the above description of the invention it is manifest that various techniques can be used for implementing the concepts of the present invention without departing from its scope. Moreover, while the invention has been described with specific reference to certain embodiments, a person of ordinary skill in the art would recognize that changes can be made in form and detail without departing from the spirit and the scope of the invention. The described embodiments are to be considered in all respects as illustrative and not restrictive. It should also be understood that the invention is not limited to the particular embodiments described herein, but is capable of many rearrangements, modifications, and substitutions without departing from the scope of the invention.

The invention claimed is:

1. A smart photovoltaic (PV) panel including a local controller, said smart PV panel comprising:
   a first plurality of PV cell groups, each of said first plurality of PV cell groups including at least one PV cell;
   at least one serial boost combiner circuit configured to receive a respective output from said first plurality of PV cell groups as inputs;
   said at least one serial boost combiner circuits comprising:
      a second plurality of boost blocks connected in parallel, each of said second plurality of boost blocks including a switching device and a respective boost block output directly connected to an output node of said serial boost combiner circuit;
      a corresponding power terminal of each said switching device directly connected to a common ground node of said serial boost combiner circuit.

2. The smart PV panel of claim 1, wherein said at least one serial boost combiner circuit further comprises a storage capacitor coupled between said output node and said common ground node.

3. The smart PV panel of claim 1, wherein a corresponding another power terminal of each said switching device of said at least one serial boost combiner circuit is coupled to said respective boost block output by a respective diode.

4. The smart PV panel of claim 1, wherein an input to each of said second plurality of boost blocks is coupled to said respective boost block output by a respective inductor and a respective diode connected in series.

5. The smart PV panel of claim 4, wherein a corresponding another power terminal of each said switching device of said at least one serial boost combiner circuit is coupled to a node between said respective inductor and said respective diode.

6. The smart PV panel of claim 1, wherein each of said first plurality of PV cell groups comprises six PV cells.

7. The smart PV panel of claim 1, wherein said second plurality of boost blocks connected in parallel comprises six boost blocks.

8. The smart PV panel of claim 1, further comprising:
   a power inverter coupled to said at least one serial boost combiner circuit;
   said local controller configured to provide power regulation for said first plurality of PV cell groups; and
   a communication unit interfaced with said local controller, said communication unit configured to exchange state information with at least one other smart PV panel over a communication network.

9. The smart PV panel of claim 8, implemented as one of a third plurality of smart PV panels deployable as a smart solar energy collection array linked by said communication network.

10. The smart PV panel of claim 9, wherein power regulation across said third plurality of networked smart PV panels is distributed among the respective local controllers of said third plurality of smart PV panels.

11. A method for implementation by a smart photovoltaic (PV) panel controller to regulate power, said method comprising:
    receiving PV cell power by an at least one serial boost combiner circuit of said smart PV panel;
    combining said PV cell power by said at least one serial boost combiner to produce a low voltage output from said at least one serial boost combiner circuit;
    determining a panel output voltage of said smart PV panel corresponding to a bus voltage of a power bus connecting a plurality of smart PV panels including said smart PV panel;
    boosting said low voltage output to said panel output voltage.

12. The method of claim 11, further comprising exchanging state information with other smart PV panels of said plurality of smart PV panels over a communication network.

13. The method of claim 12, further comprising adjusting a performance of said smart PV panel in response to said exchanging of state information so as to provide distributed power regulation for said plurality of smart PV panels.

14. A serial boost combiner circuit comprising:
    a plurality of boost blocks connected in parallel;
    each of said plurality of boost blocks including a switching device and a respective boost block output directly connected to an output node of said serial boost combiner circuit;
    wherein a corresponding power terminal of each said switching device is directly connected to a common ground node of said serial boost combiner circuit.

15. The serial boost combiner circuit of claim 14, further comprising a storage capacitor coupled between said output node and said common ground node.

16. The serial boost combiner circuit of claim 14, wherein a corresponding another power terminal of each said switching device is coupled to said respective boost block output by a respective diode.

17. The serial boost combiner circuit of claim 14, wherein an input to each of said plurality of boost blocks is coupled to said respective boost block output by a respective inductor and a respective diode connected in series.

18. The serial boost combiner circuit of claim 17, wherein a corresponding another power terminal of each said switching device is coupled to a node between said respective inductor and said respective diode.

19. The serial boost combiner circuit of claim 14, wherein said plurality of boost blocks connected in parallel comprises six boost blocks.

20. The serial boost combiner circuit of claim 14, wherein said serial boost combiner circuit is implemented in a smart photovoltaic (PV) panel.

* * * * *